May 30, 1950  C. G. WYNNE  2,509,554
CATADIOPTRIC SYSTEM WITH CORRECTING LENS MEANS
Filed April 21, 1947  3 Sheets-Sheet 1

Inventor
Charles G. Wynne
By
Ralph B. Stewart
Attorney

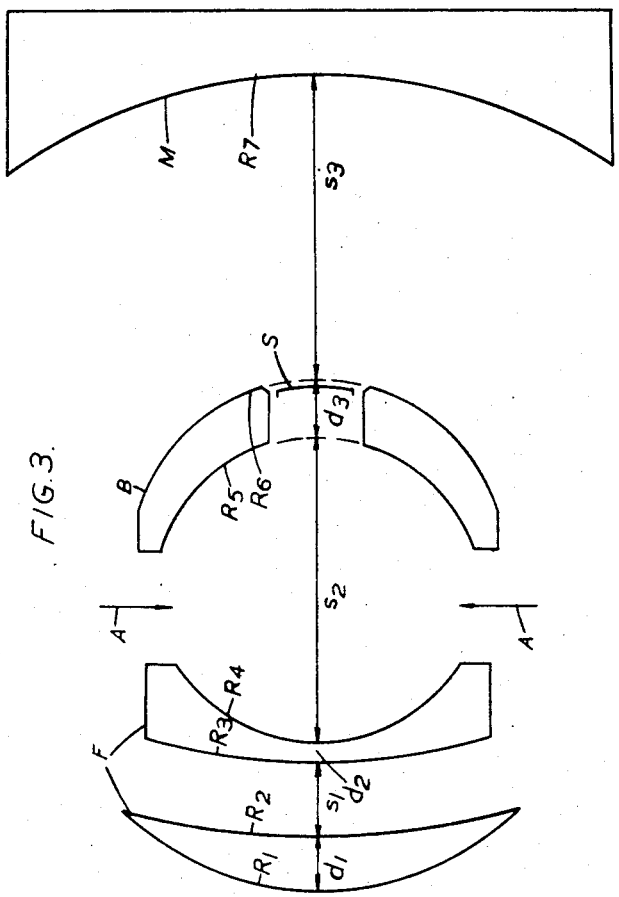

May 30, 1950        C. G. WYNNE        2,509,554
CATADIOPTRIC SYSTEM WITH CORRECTING LENS MEANS
Filed April 21, 1947        3 Sheets-Sheet 3
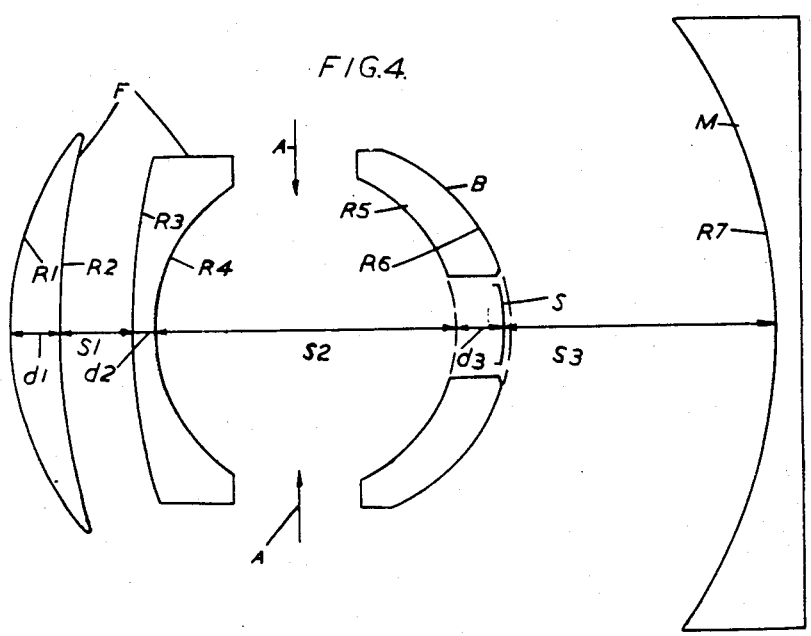
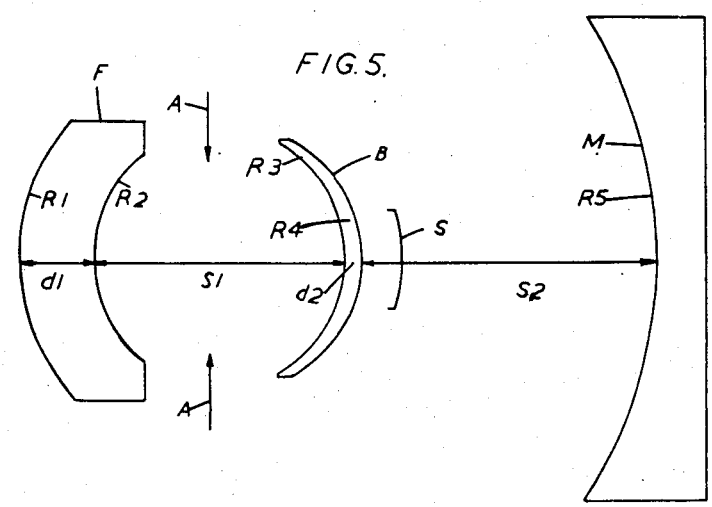
Inventor
Charles G. Wynne
By
Ralph B. Stewart
Attorney Patented May 30, 1950

2,509,554

UNITED STATES PATENT OFFICE 2,509,554

CATADIOPTRIC SYSTEM WITH CORRECTING LENS MEANS

Charles Gorrie Wynne, Bromley Hill, England, assignor to Wray (Optical Works) Limited, Bromley Hill, England, a British company Application April 21, 1947, Serial No. 742,838
In Great Britain May 1, 1946

8 Claims. (Cl. 88—57)

This invention relates to optical objectives and, more specifically speaking, to objectives in which there are refracting and reflecting components. The object of the invention is to provide such objectives in which the aberrations are corrected to a higher degree than hitherto.

Catadioptric systems have been described by Maksutov (Journal of the Optical Society of America, volume 34, No. 5), in which the spherical aberration and coma of a spherical mirror are substantially corrected by means of a single achromatic meniscus lens with spherical surfaces, placed in front of the mirror. Such systems, primarily intended for astronomical purposes, have the characteristic that they provide a virtual elimination of secondary spectrum and also comatic correction. The limitations of these systems are first, that the spherical aberration can only be sufficiently well corrected for critical work at fairly small apertures or very small focal lengths (for example, according to Maksutov, a lens of relative aperture F/1 must be restricted to a focal length of 1.37 m. m.) and secondly, that the angular field that can be covered is fairly small, since astigmatism and chromatic difference of magnification cannot be corrected simultaneously with axial colour, spherical aberration and coma. The correction of spherical aberration can be somewhat improved by the use of an achromatic meniscus of greater thickness, but, in this case, the aberrations of astigmatism and chromatic difference of magnification are increased still further, with a consequent further reduction of the useful field.

According to the present invention, these limitations are overcome by the use of two meniscus lenses, one concave and one convex toward the mirror, and each of which may be achromatic. By dividing between two meniscus lenses the over-correction of spherical aberration necessary to correct the mirror, the zonal spherical aberration may be reduced to a very small fraction of that in the systems described by Maksutov. It is possible by the present invention at the same time to achieve a high degree of correction of coma, astigmatism, distortion, and chromatic difference of magnification, while preserving the axial colour correction characteristic of the single meniscus form. Moreover, the variations of chromatic difference of magnification consequent on increasing thickness are of opposite sign in the two menisci, so that these errors may be eliminated by increasing the thickness of each, while achieving the further improvement of zonal spherical aberration which results from this.

In such systems of very large relative aperture, for example F/0.7, however, if it is desired to correct to a high degree, very thick meniscus lenses may be required and, if such systems are to be made of large focal length, as is necessary, for example, for television projection, both the light absorption by the glass and the difficulty of obtaining sufficiently large blocks of glass become significant factors.

The present invention also aims, therefore, at overcoming those difficulties and this is effected by replacing either or each of the thick meniscus lenses by a pair of thin lenses producing a similar effect to a thick meniscus. Thus instead of a thick meniscus, two thin lenses may be provided forming what may be called a divided meniscus with the front surface of the front lens and the back surface of the back lens being the same as in the thick meniscus and their inner facing surfaces of such a radius that the surfaces are substantially normal to the paraxial rays passing through them. Such a "paraxially divided" meniscus consisting of two thin glass lenses with a thick air lens between them produces no change in the power or in the first order axial aberrations and the small variations of the oblique aberrations may be corrected by general modifications to the system according to principles which are well understood.

According to a further feature of the invention, a practicable system of very large relative aperture and a high degree of correction having one thin meniscus and one divided meniscus consisting of two thin lenses equivalent to a very thick meniscus is produced by adopting the following principle thereby avoiding the additional complication of using two divided menisci. Improvement of the zonal spherical aberration is effected by increasing the thickness, or in the case of a divided meniscus, the effective thickness of either of the members singly. If, however, each member is maintained substantially achromatic when one is thickened much more than the other, the chromatic difference of magnification will usually become significantly large. The chromatic difference of magnification for the combined system may be corrected, however, by a suitable departure from the condition under which each member is individually achromatic but with the meniscus lenses maintained jointly achromatic.

In order that the invention may be clearly understood and readily carried into effect, some examples of lens systems in accordance with the invention will now be more fully described with reference to the accompanying drawings, in which:

Figure 3 shows a modification with only the front meniscus lens divided;

Figure 4 shows an objective similar to that in Figure 3 but with improved axial correction; and Figure 5 shows an example of a thick meniscus and a thin meniscus lens both undivided.

In all the figures, the spherical mirror is shown at M, the front meniscus at F and the back meniscus at B while in each case, the aperture stop is shown at A and the focal surface at S.

Figure 1:
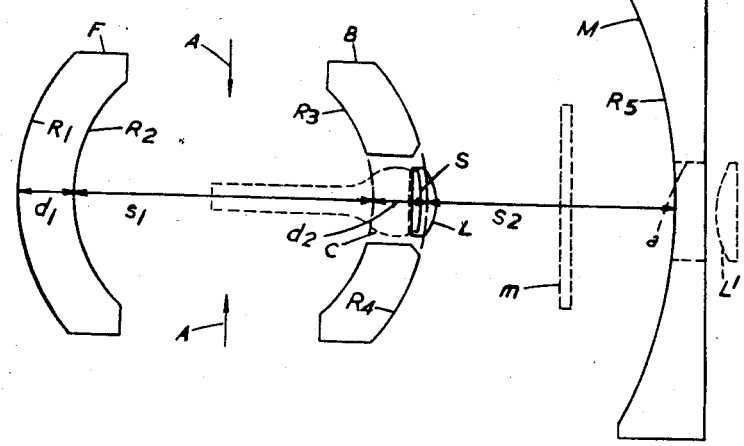
Figure 1 is a diagram of the components of one form of the novel objective with two thick meniscus lenses.

In Figure 1, as already stated the two meniscus lenses F and B are both thick lenses each consisting of a single glass. Data for the construction of this objective of focal length 1.00 and relative aperture F/1.0 will now be given in the following table in which:

$R_1, R_2 \ldots R_5$ are the radii of curvature so marked in the drawing, a positive radius indicating convexity to the front and a negative radius concavity to the front;

$d_1, d_2$ are the thicknesses of the two glasses;

$s_1$ and $s_2$, the separations between the two meniscus lenses F, B and between the back meniscus B and the mirror respectively, measured along the optical axis;

$n_d$, the mean refractive index of the glass used for the components; and

V, its Abbé V number.

| | | | | |
|---|---|---|---|---|
| $R_1$+0.9705 | $d_1$ 0.291 | $n_d$ 1.516 | V 60.6 |
| $R_2$+0.7820 | $s_1$ 1.456 | | |
| $R_3$−0.7820 | $d_2$ 0.281 | $n_d$ 1.516 | V 60.6 |
| $R_4$−0.9705 | $s_2$ 1.232 | | |
| $R_5$−2.268 | | | |

An objective made according to these data may have a focal length greater than 50 m. m. while preserving correction of aberrations within the Rayleigh limit and it will have correction of oblique aberrations of the same order over angles of field greater than 30°.

In using such a lens for astronomical photography, the photographic film or plate will, of course, be placed on the focal surface S. For use in a television receiver, a cathode ray tube will be placed with its fluorescent screen at that surface as shown at C in dotted lines in Figure 1, the back meniscus B having a central aperture to receive it.

Such a system as shown in Figure 1 and indeed those shown in the other figures, will, of course, suffer from some field curvature. This may, however, be corrected by the provision of a suitable curved "field lens" in the neighbourhood of the focus as described in British Patent specifications 24,641/1895 and 544,694, for example. Such a lens is indicated in Figure 1 at L. Apart from field curvature, the aberrations of such a field lens will be small and may be corrected by small modifications in the other components of the objective.

In the system illustrated in Figure 1 as well as in the other systems illustrated, further subsidiary mirrors for example, as are described by Maksutov loc. cit. may be provided to bring the image into a more convenient position, any necessary small modifications being made to preserve the corrections of the whole system. Thus if a subsidiary mirror is provided in the position shown at $m$ in dotted lines, the field lens could be placed at $L^1$, in which case, the spherical mirror M would have to be centrally apertured as shown at $a$.

Also in the embodiment shown in Figure 1 as well as in those shown in the other figures of the drawings, additional members may be included in the system. Thus, for example, an aspheric plate may be mounted centrally between the meniscus lenses F, B in which case, while the two meniscus lenses jointly effect a reduction in the aberrations of the spherical mirror M, approximately half the correction would be provided by the aspheric plate. Such a combination has the following advantage. In the well-known Schmidt system, axial spherical aberration can be completely corrected for a single wave length but this correction changes with wavelength in a direction corresponding to the fact that the correcting plate which is paraxially achromatic has a thickness of glass which increases with the aperture. In the system shown in Figure 1 of the drawings without a corrector plate, a similar chromatic variation of spherical aberration remains but this is opposite in sign to that in the Schmidt system since with paraxially achromatic meniscus lenses, the effective thickness of glass decreases with the aperture. Thus, a combination of the two forms of correcting elements in proper proportions makes it possible to reduce the residual chromatic errors very considerably. It is possible in this way to reduce these errors to a small fraction of their value in a system having a double meniscus as shown in Figure 1.

Figure 2:
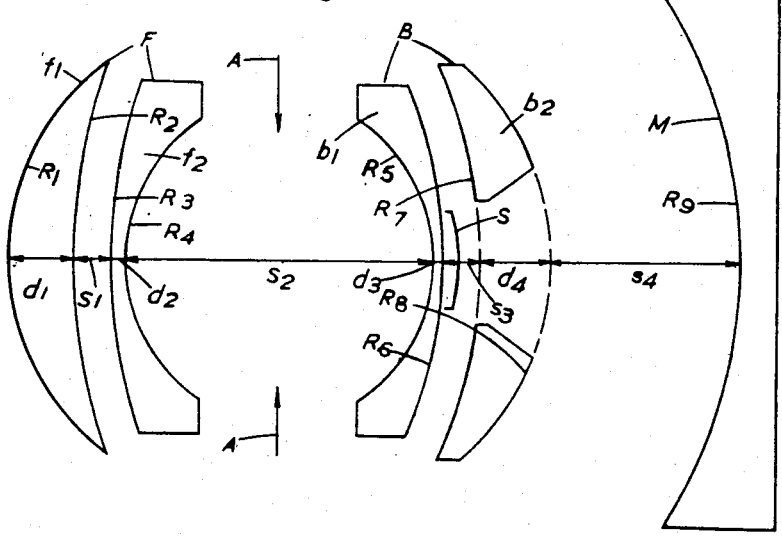
Figure 2 is a similar diagram with two "divided meniscus" lenses.

In Figure 2, as already indicated, the front meniscus F is a "divided meniscus" consisting of two glasses $f_1$ and $f_2$ with an air lens between them and the back meniscus B is similarly formed with two glasses $b_1$ and $b_2$, but both are designed to have the same type of effect as the thick meniscus lenses F, B in Figure 1. The data for this objective are given in the following table in which:

$R_1$ to $R_4$ are the successive radii of curvature of the front meniscus F;

$R_5$ to $R_8$ are those of the back meniscus B;

$R_9$ that of the spherical mirror M;

$d_1, d_2, d_3$ and $d_4$ are the thicknesses of the four glasses.

$s_1$, the thickness of the air lens in the front meniscus F;

$s_2$, the separation between the two meniscus lenses;

$s_3$, the thickness of the air lens in the back meniscus B; and $s_4$, the separation between the back meniscus B and the mirror M; while $n_d$ and V have the same significance as in Figure 1.

Equivalent focal length 1.00. Relative aperture F/0.7.

| | | | | |
|---|---|---|---|---|
| $R_1$+1.237 | $d_1$ 0.355 | $n_d$ 1.613 | V 59.3 |
| $R_2$+2.900 | $s_1$ 0.203 | | |
| $R_3$+2.697 | | | |
| $R_4$+0.8378 | $d_2$ 0.051 | $n_d$ 1.613 | V 59.3 |
| | $s_2$ 1.560 | | |
| $R_5$−0.8480 | $d_3$ 0.051 | $n_d$ 1.613 | V 59.3 |
| $R_6$−2.005 | $s_3$ 0.203 | | |
| $R_7$−2.206 | | | |
| $R_8$−1.286 | $d_4$ 0.355 | $n_d$ 1.613 | V 59.3 |
| $R_9$−2.436 | $s_4$ 0.954 | | |

The objective shown in Figure 3 has a divided front meniscus F thickened much more than the back meniscus B but with the chromatic difference of magnification for the combined system corrected by a departure from the condition under which each member is individual achromatic but with the two meniscus lenses F, B jointly achromatic.

The data for this objective having an equivalent focal length of 1.00 and relative aperture of F/0.75 is given in the following table in which:

$R_1$ to $R_4$ are the successive radii of curvature of the front meniscus which is a divided meniscus;

$R_5$ and $R_6$ those of the back meniscus; and $R_7$ that of the spherical mirror, a positive radius indicating convexity to the front and a negative radius, concavity to the front;

$d_1$, $d_2$ and $d_3$ the thicknesses of the three glasses;

$S_1$, the thickness of the air lens in the front meniscus;

$S_2$, and $S_3$, the separations between the two menisci and between the back meniscus and the mirror respectively;

$n_d$, the mean refractive index of the glass used for the components; and

V its Abbé V number.

| | | | |
|---|---|---|---|
| $R_1+1.4533$ | $d_1$ 0.2834 | $n_d$ 1.6130 | V 59.3 |
| $R_2+3.5410$ | $S_1$ 0.3779 | | |
| $R_3+3.1633$ | $d_2$ 0.0945 | $n_d$ 1.6130 | V 59.3 |
| $R_4+0.8150$ | $S_2$ 1.4170 | | |
| $R_5-0.8150$ | $d_3$ 0.2834 | $n_d$ 1.6130 | V 59.3 |
| $R_6-0.9549$ | $S_3$ 1.4640 | | |
| $R_7-2.5375$ | | | |

The use of one thick meniscus and one thin meniscus as in Figure 3 requires for full correction a departure from separate achromatism with a more divergent thick meniscus and a less divergent thin meniscus. Over a considerable range of change of relative thicknesses, the zonal spherical aberration remains approximately constant for a given sum of the two axial thicknesses as is true for the example shown in Figure 3. This continues to be the case even after the total effect of the thin meniscus B on the spherical aberration of the system changes from over-correction to under-correction but as this is pushed further, a point is reached at which the higher order under-correction on the back surface of the back meniscus B increases very rapidly, making possible a controlled balancing of the higher orders of aberration and hence a very great improvement in the axial correction. The example shown in Figure 4 illustrates such a lens although it appears to depart little from that shown in Figure 3.

The data for the lens shown in Figure 4 are given in the following table where the reference characters have the same significance as in Figure 3.

Equivalent focal length 1.00. Relative aperture F/0.75.

| | | | |
|---|---|---|---|
| $R_1+1.4420$ | $d_1$ 0.2747 | $n_d$ 1.613 | V 55.8 |
| $R_2+3.5200$ | $S_1$ 0.3662 | | |
| $R_3+3.1538$ | $d_2$ 0.0916 | $n_d$ 1.613 | V 56.8 |
| $R_4+0.7995$ | $S_2$ 1.4880 | | |
| $R_5-0.8126$ | $d_3$ 0.2660 | $n_d$ 1.613 | V 59.3 |
| $R_6-0.9351$ | $S_3$ 1.3504 | | |
| $R_7-2.5547$ | | | |

The above method of control of higher order spherical aberration by the use of one thick and one thin meniscus is not restricted to cases in which the thick meniscus is paraxially divided into two glasses and the thicknesses involved with smaller apertures may not require this division. In fact, Figure 5 shows an objective embodying this principle in which two single glass meniscus lenses are employed.

The data for this system are given in the following table, in which the reference characters have the same meaning as in Figure 1.

Equivalent focal length 1.00. Relative aperture F/1.00.

| | | | |
|---|---|---|---|
| $R_1+0.9676$ | $d_1$ 0.3810 | $n_d$ 1.613 | V 59.3 |
| $R_2+0.6718$ | $S_1$ 1.2529 | | |
| $R_3-0.6666$ | $d_2$ 0.0762 | $n_d$ 1.613 | V 59.3 |
| $R_4-0.6837$ | $S_2$ 1.4772 | | |
| $R_5-2.2455$ | | | |

I claim:

1. An optical objective comprising a spherical mirror and a pair of spaced achromatic meniscus lenses coaxial with said mirror located on the concave side of said mirror and jointly corrective of the spherical aberration and coma of said mirror, one of said meniscus lenses being concave to said mirror and the other convex to said mirror, the center of curvature of at least one surface of each meniscus lens being displaced not more than 0.4 times the equivalent focal length of the objective from the center of curvature of the mirror.

2. An objective according to claim 1 wherein the center of curvature of at least one surface of each meniscus lens is displaced not more than 0.2 times the equivalent focal length of the objective from the center of curvature of the mirror.

3. An objective according to claim 1 wherein the glasses of said meniscus lenses have substantially the same Abbé V number.

4. An objective according to claim 1 wherein the glasses of said meniscus lenses have substantially the same Abbé V number, each of said meniscus lenses being individually non-achromatic but said two meniscus lenses being jointly achromatic.

5. An optical objective comprising a spherical mirror and a pair of meniscus lenses coaxial with said mirror located on the concave side of said mirror and jointly corrective of the spherical aberration and coma of said mirror, one of said meniscus lenses being concave to said mirror and the other convex to said mirror and at least one of said meniscus lenses consisting of a pair of thin glasses with an interposed thick air lens and said thin glasses having inner facing surfaces of such radii of curvature that said surfaces are substantially normal to the paraxial rays passing through same.

6. An objective according to claim 5 wherein the glasses of said meniscus lenses have substantially the same Abbé V number.

7. An optical objective comprising a spherical mirror and a pair of meniscus lenses coaxial with said mirror located on the concave side of said mirror and jointly corrective of the spherical aberration and coma of said mirror, one of said meniscus lenses being concave to said mirror and the other convex to said mirror and one of said meniscus lenses being a thin glass meniscus and the other consisting of a pair of thin glasses with an interposed thick air lens and each of said meniscus lenses being individually non-achromatic but said two meniscus lenses being jointly achromatic.

8. An objective according to claim 7 wherein the radius of curvature of the convex surface of the thinner meniscus is not greater than 1.2 times the radius of the concave surface of the thicker meniscus.

CHARLES GORRIE WYNNE.

REFERENCES CITED

The following references are of record in the file of this patent:

UNITED STATES PATENTS

| Number | Name | Date |
|---|---|---|
| 620,978 | Schupmann | Mar. 14, 1899 |
| 2,141,884 | Sonnefeld | Dec. 27, 1938 |
| 2,350,112 | Houghton | May 30, 1944 |
| 2,409,971 | Bennett | Oct. 22, 1946 |
| 2,420,349 | Bouwers | May 13, 1947 |
| 2,458,132 | Baker | Jan. 4, 1949 |

FOREIGN PATENTS

| Number | Country | Date |
|---|---|---|
| 82,671 | Germany | Aug. 7, 1895 |
| 883,937 | France | Apr. 5, 1943 |
| 68,442 | Norway | Oct. 16, 1944 |

OTHER REFERENCES

Journal Optical Society of America, vol. 34, No. 5, May 1944, pages 270 to 284. Article by Maksutov. Published by American Institute of Physics, 57 East 55th Street, New York, N. Y.